Patented Dec. 14, 1926.

1,610,485

UNITED STATES PATENT OFFICE.

CHARLES F. BOOTH, OF ANNISTON, ALABAMA, AND PAUL LOGUE, OF ST. LOUIS, MISSOURI, ASSIGNORS TO FEDERAL PHOSPHORUS COMPANY, OF BIRMINGHAM, ALABAMA, A CORPORATION OF ALABAMA.

PROCESS FOR THE REMOVAL OF BORAX FROM ALKALI-METAL NITRATES.

No Drawing.   Application filed July 28, 1924. Serial No. 728,655.

This invention relates to a new and improved process of purifying commercial sodium and potassium nitrates and producing with one crystallization what is commonly referred to as double refined nitrates. The process also relates to a method of removing borax from either nitrate of soda or nitrate of potash, or mixtures of these salts.

The object of this invention is to provide a quick, simple and effective means for the purification of crude or commercial nitrate of soda or potash so that the resultant material is suitable for use either in the arts or in the industries where a material of a higher grade than the commercial nitrate is required.

At the present time, all refined nitrate which is used for such purposes as curing of meat in the packing house industry is produced by a double crystallization where the impurities are removed by dissolving the nitrate and re-crystallizing. In the preparation of nitrates for curing meat it is desirable that the borax content be as low as possible and the purpose of this invention is the elimination of borax in a manner different from that used heretofore, and by a method which is more economic and satisfactory than the double-crystallization process.

Ordinarily crude commercial nitrate contains considerable quantities of borax and to eliminate this we propose that the crude nitrate be dissolved in water until a solution of about 60% is reached. This solution is then brought to a boiling temperature and the precipitating medium is added. The nitrate solution is kept hot for several hours after which it is filtered, and the filtrate is ready for cooling and crystallization. The precipitating medium for the elimination of borax consists preferably of a mixture of magnesia (MgO) and lime in the proportions of about 6 pounds of the former and 10 pounds of the latter per 1,000 pounds of nitrate treated. While the use of magnesia (MgO) and lime is a preferred medium, it is not essential that magnesia (MgO) be used because other magnesium compounds and lime combinations have been found capable of removing borax. For instance it has been observed that "magnite", which is an oxide of magnesia and lime, will serve as a source of magnesia. If additional lime is added to the "magnite" to approximate the proportions given below, this mixture will be satisfactory. Chlorides, sulphates, iodates and iodides which are present in crude nitrates are not present in objectionable quantities in the nitrate purified by this process.

By the use of this process it is possible to reduce the borax content of a nitrate solution from 0.2% borax to as low as 50 parts per million borax in the crystallization nitrate. The sump liquors from the crystallization of nitrate may be retreated as above described for the removal of borax.

The advantage of this process over that commonly used where re-crystallization is employed is chiefly the ease with which the borax may be eliminated and the reduction of the equipment necessary to carry on such a purification operation. As illustrative of the proportions of materials which may be used in the practice of our invention as a continuous operation, the following is given:

To 150 gallons of water and 78 gallons of sump liquor we add 3,000 pounds of nitrate and heat the solution to boiling. Then 18 pounds of magnesia and 30 pounds of lime are added and the mixture agitated and kept at the boiling temperature for approximately three hours, after which it is filtered.

The proportions of these precipitating ingredients will vary largely, depending on the analysis of the material which is being treated, and if a nitrate is being used which is low in borax content, the requirement of magnesia and lime will be reduced accordingly. The solution is then filtered in any well known manner, and then cooled until crystallization takes place. The crystals are separated from the liquor by a centrifuge or in any other practical manner. They are dried at low temperature, say 80° F., and are then ready for shipment. The sump liquor and wash water from the filter and centrifuge are concentrated by boiling to about 40% nitrate content and after adding nitrate to increase nitrate content to 60% the sump liquor is then returned to the dissolving tank.

A great deal of experimenting has been done to determine what reagents may be most satisfactorily used for the removal of borax and the adoption of a mixture of magnesia and lime is a result of the tests made on this method of borax elimination. The use of lime for borax removal in nitrate of potash purification has been proposed in United States Patent No. 1,356,806, issued October 26th, 1920, to Robert P. Calvert. We have found by experimentation and careful analyses of the product and the mother liquors that while the borax content may be reduced it is not practicable to eliminate borax from nitrate merely by treating the solution with lime and, therefore, what we propose using is a mixture of lime and magnesia substantially as set forth. To show the effect of the addition of magnesia to lime as a precipitant a sample of nitrate containing .2% borax was treated with lime only and showed 250 parts per million borax remaining in the crystallized nitrate; when treated with magnesia alone it showed 200 parts per million borax remaining in the crystallized nitrate; and when treated with lime and magnesia according to our process it showed less than 50 parts per million borax remaining in the crystallized nitrate.

When we refer to nitrate solutions we have chiefly in mind solutions of nitrate of soda or potash, though it is possible that our process is applicable to the removal of borax from other nitrate solutions.

Having thus described our invention, what we claim as new and desire to secure by Letters Patent, is:—

1. The hereindescribed process for removing borax from nitrate solutions, which consists in dissolving nitrate and precipitating the borax by the addition of lime and magnesia.

2. The hereindescribed process for removing borax from nitrate solutions, which consists in dissolving nitrate and precipitating the borax by the addition of lime and magnesia in the proportion of approximately 6 parts of magnesia and 10 parts of lime to 1000 parts of nitrate.

3. The hereindescribed process for removing borax from nitrate solutions, which consists in dissolving nitrate, precipitating the borax by the addition of lime and magnesia, filtering the solution, and cooling to point of crystallization.

4. The hereindescribed process for removing borax from nitrate solutions, which consists in dissolving nitrate, heating the nitrate solution to boiling temperature, and precipitating the borax by the addition of lime and magnesia.

5. The hereindescribed process for removing borax from nitrate solutions, which consists in dissolving nitrate, heating the nitrate solution to boiling temperature, precipitating the borax by the addition of lime and magnesia, and keeping the solution at boiling temperature for approximately three hours.

6. The hereindescribed continuous process for the removal of borax from nitrate solutions, which consists in dissolving nitrate, boiling the solution, adding lime and magnesia to precipitate the borax, filtering the solution, cooling the filtered solution and removing the crystallized nitrate, concentrating the sump liquor and wash water and using it to dissolve additional nitrate.

In testimony whereof we affix our signatures.

CHARLES F. BOOTH.
PAUL LOGUE.